United States Patent
Gubba et al.

(10) Patent No.: US 11,347,719 B2
(45) Date of Patent: May 31, 2022

(54) MULTI-TABLE DATA VALIDATION TOOL

(71) Applicant: Capital One Services, LLC, McLean, VA (US)

(72) Inventors: Suresh G. Gubba, Flower Mound, TX (US); Babitha Bandi, Plano, TX (US); Raveender Kommera, Flower Mound, TX (US)

(73) Assignee: Capital One Services, LLC, McLean, VA (US)

( * ) Notice: Subject to any disclaimer, the term of this patent is extended or adjusted under 35 U.S.C. 154(b) by 32 days.

(21) Appl. No.: 16/731,894

(22) Filed: Dec. 31, 2019

(65) Prior Publication Data

US 2021/0200744 A1 Jul. 1, 2021

(51) Int. Cl.
*G06F 16/23* (2019.01)
*G06F 16/25* (2019.01)
*G06F 16/21* (2019.01)
*G06F 16/22* (2019.01)

(52) U.S. Cl.
CPC ........ *G06F 16/2365* (2019.01); *G06F 16/214* (2019.01); *G06F 16/2282* (2019.01); *G06F 16/258* (2019.01)

(58) Field of Classification Search
CPC ............. G06F 16/2365; G06F 16/2282; G06F 16/214; G06F 16/258
See application file for complete search history.

(56) References Cited

U.S. PATENT DOCUMENTS

| 5,604,901 | A | * | 2/1997 | Kelley | .................... G06F 7/02 |
| 7,548,898 | B1 | | 6/2009 | Tarenskeen et al. | |
| 2003/0028555 | A1 | | 2/2003 | Young et al. | |
| 2005/0149537 | A1 | * | 7/2005 | Balin | .................... G06F 16/214 |
| 2010/0250497 | A1 | * | 9/2010 | Redlich | .............. H04L 63/0227 |
| | | | | | 707/661 |
| 2012/0030172 | A1 | * | 2/2012 | Pareek | ................ G06F 16/3331 |
| | | | | | 707/635 |
| 2012/0124081 | A1 | | 5/2012 | Ebrahimi et al. | |
| 2012/0265726 | A1 | | 10/2012 | Padmanabhan et al. | |

(Continued)

OTHER PUBLICATIONS

Gholami, M.F., et al., "Cloud migration process—A survey, evaluation framework, and open challenges", The Journal of Systems and Software 120:31-69 (2016).

(Continued)

*Primary Examiner* — Alford W Kindred
*Assistant Examiner* — Lin Lin M Htay
(74) *Attorney, Agent, or Firm* — KDB

(57) ABSTRACT

A multi-table data validation tool is run following migration of data from a source database to a target database. The multi-table data validation tool extracts data from source and target locations into memory, transforms data and masks confidential data as needed, then performs two types of data comparison, including row count and data content comparison. Result files of each comparison are available to the migration team, enabling updates and improvements to the migration tools. The multi-table data validation tool may further be used to extract requested data from either the source database or the target database. The multi-table data validation tool may be dockerized as a container for ease of deployment in different environments.

19 Claims, 11 Drawing Sheets

(56) References Cited

U.S. PATENT DOCUMENTS

| | | | |
|---|---|---|---|
| 2013/0110766 A1* | 5/2013 | Promhouse | G06F 9/466 |
| | | | 707/607 |
| 2014/0068706 A1* | 3/2014 | Aissi | G06F 21/6254 |
| | | | 726/1 |
| 2014/0310231 A1 | 10/2014 | Sampathkumaran et al. | |
| 2015/0019488 A1* | 1/2015 | Higginson | G06F 16/214 |
| | | | 707/634 |
| 2017/0272472 A1* | 9/2017 | Adhar | G06F 21/316 |
| 2020/0019558 A1* | 1/2020 | Okorafor | G06F 16/211 |
| 2020/0311304 A1* | 10/2020 | Parthasarathy | G06F 11/3006 |

OTHER PUBLICATIONS

Paygude, P., Devale, P.R., "Automated Data Validation Testing Tool for Data Migration Quality Assurance", International Journal of Modern Engineering Research 3(1):599-603 (Jan.-Feb. 2013).

* cited by examiner

Figure 4A

```
"workflows" : [
  {
    "name" : "workflow-1",
    "description": "Source and Target datasource details & table names to compare",
    "extract": {
402   "jdbc": {
        "sources": [ {
            "name": "snowflake",
            "format": "jdbc",
            "url": "jdbc:snowflake://accountname.snowflakecomputing.com",
            "driver": "net.snowflake.client.jdbc.SnowflakeDriver",
            "username": "snowuser",
            "password": "pwd1",
            "warehouse" : "COMP_Q_WH",
            "database" : "DB",
            "schema": "SCH_HIST_TB",
            "queryURI": ""/data-compare/sql/extract/",
            "replaceStringInTableName": "",
            "sets" : [ {
                "parallelCount" : 8,
                "tables": [ {
                    "name": "SNOW_LONFILE",
                    "tableName": "LONFILE",
                    "queryFileName": "select_sf.sql",
                    "filterQueryFileName": "td-snowflake-snapdate-filter.sql",
                    "partitionNum": 1,
                    "cacheFlag": false
                } ] } ],
          {
            "name": "teradata-pr",
            "format": "jdbc",
            "url": "jdbc:teradata://teradata_hostname/",
            "driver": "com.teradata.jdbc.TeraDriver",
            "username": "terauser",
            "password": "pwd1",
            "schema": "SCH_HIST_TB",
            "queryURI": ""/data-compare/sql/extract/",
            "replaceStringInTableN\ame": "",
            "sets" : [ {
                "parallelCount" : 8,
                "tables": [ {
                    "name": "TD_LONFILE",
                    "tableName": "LONFILE",
                    "queryFileName": "select_td.sql",
                    "filterQueryFileName": "td-snowflake-snapdate-filter.sql",
                    "partitionNum": 1,
                    "cacheFlag": false
                } ] } ] } ] }
    },
```

```
        "delta" : {
        "description": "Dataframes to be compared with Keyvalue",
404     "sourceName" : "teradata",
        "targetName" : "snowflake",
        "queryURI" : ""/data-compare/sql/transform/",
        "parallelCount" : 8,
        "datasets" : [
                {
                    "sourceTableName": "TD_LONFILE",
                    "targetTableName": "SNOW_LONFILE",
                    "sourceQueryFileName": "",
                    "targetQueryFilename": "",
                    "excludeColumns": [],
                    "columnResultTableName": "LONFILE_column_delta",
                    "keyResultTableName": "LONFILE_key_delta",
                    "cacheFlag": false,
                    "limit": -1,
                    "keyColumns": ["loan_num"]
                } ]
        },
        "load" : {
        "description": "Output file names and location",
406     "file" : {
            "targets" : [ {
                "name" : "localSink",
                "format" : "csv",
                "parallelWrites" : 8,
                "queryURI" : ""/data-compare//sql/transform/",
                "files" : [
                    {
                        "name": "LONFILE_key_delta",
                        "path": ""/data-compare-output/",
                        "delimiter": "|",
                        "includeHeader": true,
                        "fileName": "LONFILE_key_delta.csv",
                        "prefixDateToFileName": false,
                        "prefixDatePattern": "yyyyMMdd",
                        "createDateSubFolder": true,
                        "queryFileName": "",
                        "cacheFlag": false,
                        "partitionNum": 1
                    },
                    {
                        "name": "LONFILE_column_delta",
                        "path": ""/data-compare-output/",
                        "delimiter": "|",
                        "includeHeader": true,
                        "fileName": "LONFILE_column_delta.csv",
                        "prefixDateToFileName": false,
                        "prefixDatePattern": "yyyyMMdd",
                        "createDateSubFolder": true,
                        "queryFileName": "",
                        "cacheFlag": false,
                        "partitionNum": 1
                    }
                ]
            }
        }
```

| Key\|KeyValue\|MissingLocation |
|---|
| db_nm:tbl_nm:sor_id\|PMDW_ACCT_TB:BILLG_STMT_DELQ_REC_DETL:22\|teradata |
| db_nm:tbl_nm:sor_id\|PMDW_ACCT_TB:CAR_DEMD_RQST_ALR:56\|teradata |
| db_nm:tbl_nm:sor_id\|PMDW_ACCT_TB:CAR_WORK_CASE_PHASE_CMNT:56\|teradata |
| db_nm:tbl_nm:sor_id\|PMDW_ACCT_TB:INCM_ANLYS_DETL:97\|teradata |
| db_nm:tbl_nm:sor_id\|PMDW_ACCT_TB:LPS_PROC_MGMT_INSRR_726:-2\|snowflake |
| db_nm:tbl_nm:sor_id\|PMDW_ACCT_TB:LPS_PROC_MGMT_ISU_726:-2\|snowflake |

| Key|KeyValue|ColumnName|sourceColumnType|TargetColumnType|sourceValue|TargetValue|MatchCondition |
|---|
| db_nm|tbl_nm|sor_id|PMDW_ACCT_TB:ASSET:97|last_cmp|d_load_dt|Date|Date|2018-07-26|2018-06-30|false |
| db_nm|tbl_nm|sor_id|PMDW_ACCT_TB:ASSET:97|last_cmp|d_load_ts|Timestamp|Timestamp|2018-07-28 04:54:09.614|2018-07-30 11:51:08.0|false |
| db_nm|tbl_nm|sor_id|PMDW_ACCT_TB:CLTRL:87|last_cmp|d_load_dt|Date|Date|2016-11-07|2018-04-10|false |
| db_nm|tbl_nm|sor_id|PMDW_ACCT_TB:ECM_LOAN:38|last_cmp|d_load_ts|Timestamp|Timestamp|2018-08-01 08:08:01.377|2018-08-01 08:26:18.0|false |
| db_nm|tbl_nm|sor_id|PMDW_ACCT_TB:EQR_PERS:116|last_cmp|d_load_dt|Date|Date|2016-11-07|2018-07-18|false |
| db_nm|tbl_nm|sor_id|PMDW_ACCT_TB:EQR_PERS:116|last_cmp|d_load_ts|Timestamp|Timestamp|2015-12-10 07:11:28.0|2018-07-19 09:54:06.0|false |

| Source and Target DB Engines | Schemas | Tables | Size(GB) |
|---|---|---|---|
| On-premise DB2 to AWS Cloud PostGresQL | 4 | 133 | 110 |
| On-premise Oracle to AWS Cloud Oracle | 5 | 2035 | 550 |
| On-premise SQL Server to AWS Cloud SQL Server | 7 | 3540 | 800 |
| On-premise Teradata to AWS Cloud Snowflake | 7 | 1000 | 3575 |

<u>700</u>

MULTI-TABLE DATA VALIDATION TOOL

BACKGROUND

With the availability of cloud-based resources, many companies are migrating legacy data to the cloud for data analytical, legal, and compliance needs. These companies strive to ensure that the migrated data is consistent and secure.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques for validating data migrated from one location to another using a multi-table data validation tool. The multi-table data validation tool performs both row count and data content comparison, with result files being used to improve the tools for subsequent migrations. The multi-table data validation tool may further be used to extract requested data from the database. A container including the multi-table data validation tool enables ease of deployment in different environments.

Further, an embodiment is directed to an apparatus comprising a processor and a memory coupled to the processor, the memory comprising instructions that, when executed by the processor, cause the processor to load a first table from a source database into first memory locations, the source database having been generated using a first database engine, load a second table from a target database into second memory locations, the target database having been generated by a software program for migrating the source database from the first database engine to a second database engine, perform a row count comparison between the first table and the second table, store results of the row count comparison in a row count mismatch file, perform a data comparison between the first table and the second table, and store results of the data comparison in a data mismatch file.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

The foregoing aspects and many of the attendant advantages of this document will become more readily appreciated as the same becomes better understood by reference to the following detailed description, when taken in conjunction with the accompanying drawings, wherein like reference numerals refer to like parts throughout the various views, unless otherwise specified.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIGS. 4A and 4B illustrate a sample configuration of an SQL script for implementing the method of FIG. 3.

FIG. 5 is a sample key-delta output file generated by the multi-table data validation software of FIGS. 1 and 2.

FIG. 6 is a sample column-delta output file generated by the multi-table data validation software of FIGS. 1 and 2.

FIG. 7 is a table illustrating data migration examples using the multi-table data validation software of FIGS. 1 and 2.

DETAILED DESCRIPTION

Various embodiments are generally directed to techniques for validating data migrated from one location to another using a multi-table data validation tool. The multi-table data validation tool is run following migration of the data from one location to another. The multi-table data validation tool extracts data from source and target locations into memory, transforms data and manages confidential data as needed, then performs two types of data comparison, including row count and data content comparison. Result files of each comparison are available to the migration team, enabling updates and improvements to the migration tools. The multi-table data validation tool may further be used to extract requested data from the source database or the target database. The multi-table data validation tool may be containerized for ease of deployment in different environments.

With general reference to notations and nomenclature used herein, the detailed descriptions which follow may be presented in terms of program processes executed on a computer or network of computers. These process descriptions and representations are used by those skilled in the art to most effectively convey the substance of their work to others skilled in the art.

A process is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations.

Figure 1:
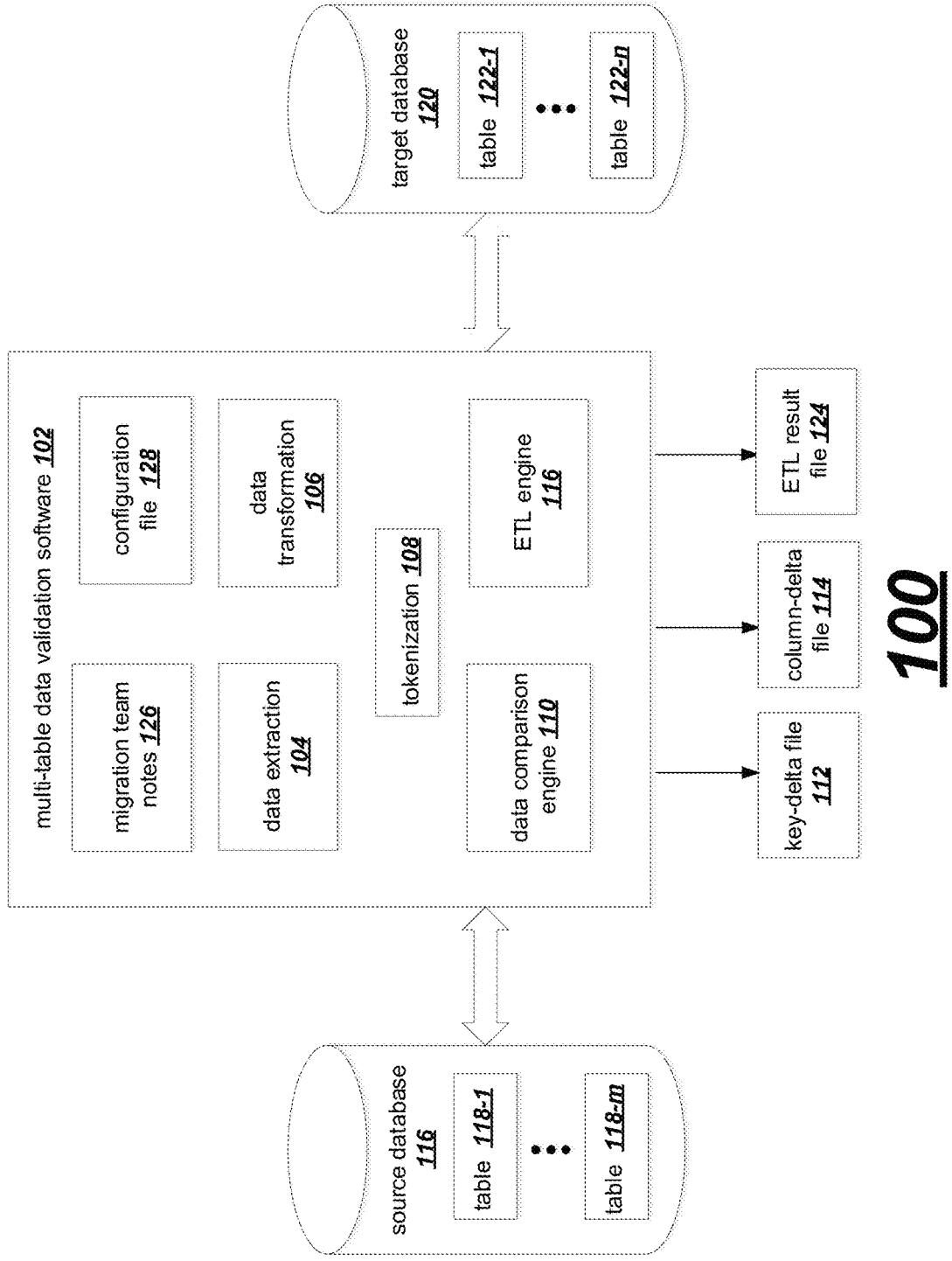
FIG. 1 illustrates an embodiment of a system for multi-table data validation.

FIG. 1 is a simplified block diagram of a system 100 for multi-table data validation. The system 100 consists of multi-table data validation software 102, also known herein as a multi-table data validation tool 102, and two databases, a source database 116 and a target database 120. The source database includes m tables 118-1-118-$m$ for integer m. Similarly, the target database 120 includes n tables 122-1-122-$n$ for integer n. The source and target databases may be on-premises or cloud-based. Each of these tables may feature any number of rows and columns. The multi-table data validation software 102 operates on the source and target databases 116, 120.

The multi-table data validation software 102 consists of sub-portions for the various capabilities of multi-table data validation, including data extraction 104, data transformation 106, tokenization 108, a data comparison engine 110, and an ETL engine 116. The multi-table data validation software 102 generates results in the form of output files, namely, a key-delta file 112, a column-data file 114, and an ETL results file 124, each of which is explained in more detail below.

The data extraction portion 104 of the multi-table data validation software 102 retrieves specified tables from the source and target databases 116, 120 and stores them into distinct memory locations or portions of memory for subsequent analysis. The data transformation portion 106 performs operations on table data, once it is stored in memory, as needed, due to the differences in how the tables are stored between the source and target databases. Legacy databases may, for example, store dates with using two digits for the year while newer databases store year information using four digits. Information may be coded differently between the two databases. Redundant data in the source database may be condensed in the target database. Comma-separated lists in the source database may be stored in the target database in separate columns. These are but a few examples of how data may be stored differently between the legacy (source) database and the newer (target) database. The data transformation portion 106 of the multi-table data validation software 102 addresses these differences before comparisons between two tables in memory are made.

The tokenization portion 108 manages any confidential data before comparisons between the two databases are made. Organizations have learned to segment confidential information from other stored data due to privacy concerns, the expense of securing confidential data, and to avoid damages in case of data breaches. Standards promulgated to protect the privacy and security of confidential information, such as the Payment Card Industry Data Security Standard (PCI DSS) for financial transactions and the Health Insurance Portability and Accountability Act (HIPAA) for medical records, have resulted in many companies either not storing confidential information at all or promulgating mechanisms to ensure compliance with these standards. In some cases, legacy databases may not be compliant with these and other privacy/security standards. In other cases, compliance of the legacy database exists, but the organization has decided to control and limit access to the confidential data. Thus, during the migration of legacy databases, confidential information may be stripped from the source database 116 and replaced with substitutes, such as tokens, when the data is stored in the target database 120. This allows the confidential information to be separately stored and protected, such as by using more robust and costly encryption than that needed for the remaining data of the organization. Any portions of data that have been tokenized are masked by the tokenization portion 108. Subsequent data comparisons by the multi-table data validation software 102 would avoid the masked portions.

The data comparison engine 110 of the multi-table data validation software 102 performs the actual comparison of the extracted portions stored in memory, portion(s) of which may have been transformed and/or masked prior to comparison. The data comparison engine 110 selects one or more tables and one or more columns of the stored data and performs a row count comparison between the selected tables/columns. Column(s) may be selected based on having unique entries, with the selected column(s) being used as the key for counting rows in the two tables. Any differences in row count (mismatches) are stored in the key-delta file 112. The data comparison engine 110 also performs a data comparison between the selected tables/columns. Any differences in data are stored in the column-delta file 114. In some embodiments, the key-delta file 112 and the column-delta file 114 are stored in a cloud storage service.

The Extract, Transform, and Load (ETL) engine 116 is a feature of the multi-table data validation software 102 which is not part of the validation. Instead, the ETL engine 116 enables data to be retrieved and stored in accordance with a user request. Using the ETL engine 116, the user may submit a particular request for data, from either the source database 116 or the target database 120, with the result being stored in an ETL result file 124. A request for a particular column of a table, such as all the customer names in the table, may be made. A request for a large number of rows and a small number of columns in a table having hundreds of rows and hundreds of columns may be made. A request for an entire table may be made. The ETL engine 116 is flexible enough to accommodate a variety of different requests. Further, by allowing requests from either source or target databases, the ETL engine 116 may extract confidential data from the source database that is no longer available in the target database, due to the tokenization that occurred during migration. When making a request for data from one of the tables, the user may further specify a format for the ETL result file 124, such as a Comma Separated Value (CSV) file, Java Script Object Notation (JSON), and Parquet file format. The results file 124 is then stored in a location accessible to the user.

The multi-table validation software 102 further receives notes 126 from the migration team that may be used to generate a configuration file 128. In one example, the notes 126 are received from the migration or development teams and manually entered to generate the configuration file 128. (An example configuration file 400 is shown in FIGS. 4A and 4B.) The migration team notes 126 may indicate which portions of data were transformed between the source 116 and target databases 120, which is useful for the data transformation portion 106. The migration team notes 126 may also indicate where the data resides, which portions of data need to be extracted from source and target databases, and which table/columns are to be compared. The migration team notes 126 may also indicate which portions of data in the source database 116 were deemed confidential and thus tokenized before being moved to the target database 120, which is useful for the tokenization portion 108.

Figure 2:
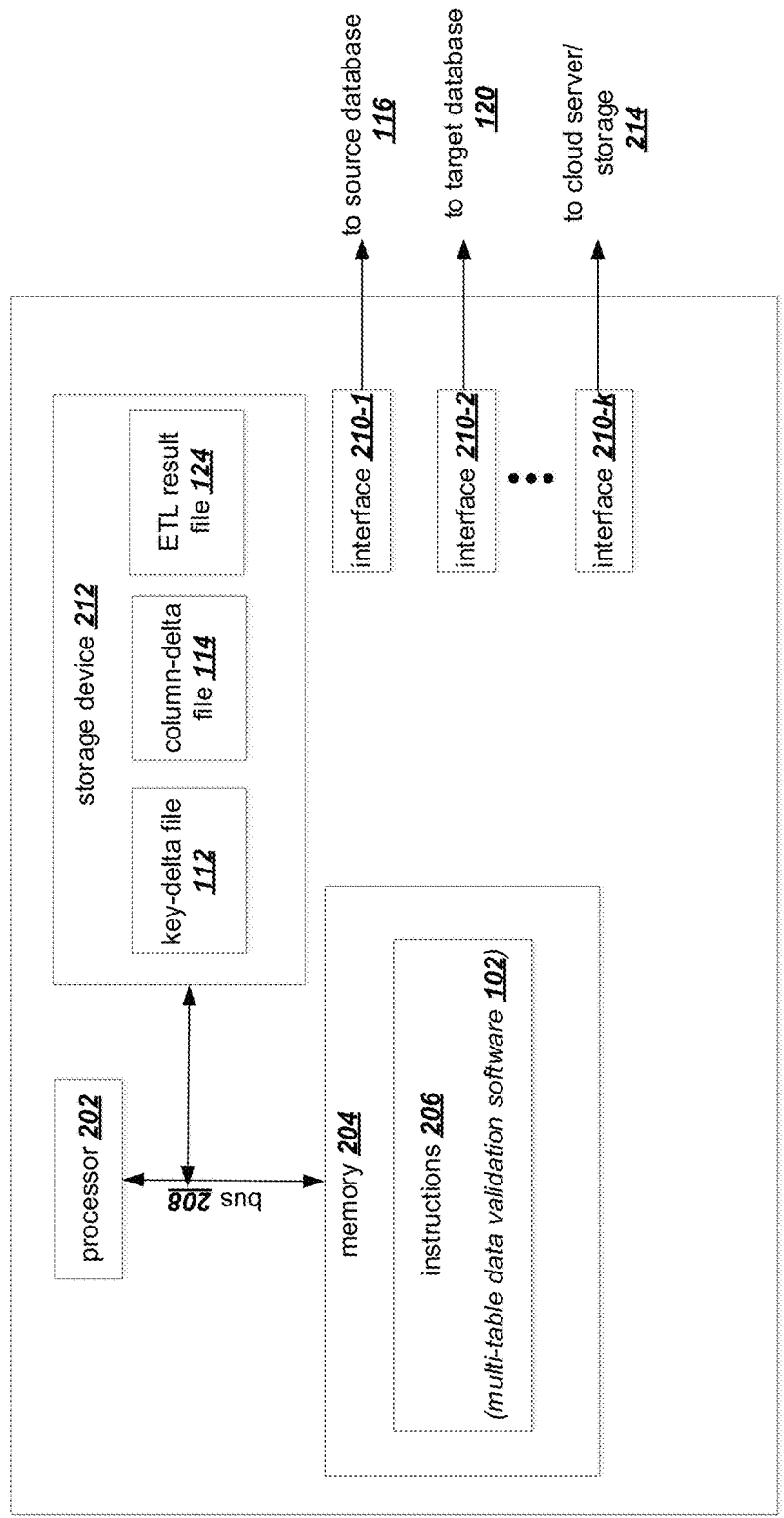
FIG. 2 illustrates an embodiment of an apparatus to implement the system of FIG. 1.

FIG. 2 is a simplified block diagram of an apparatus for multi-table data validation 200. The apparatus for multi-table data validation 200 consists of a processor 202 and memory 204 connected to one another by a bus 208. The processor 202 may be circuitry arranged to execute instructions. The processor 202 may be a commercial processor and may include multiple cores. The processor 202 and memory 204 may be based on any of a variety of types of processor and memory circuitry, respectively, numerous examples of which are provided in conjunction with FIG. 10. In the memory 204 are stored instructions 206 which are executable by the processor 202. Instructions 206 may also be referred to herein as "multi-table data validation software" for convenience.

Also coupled to the processor 202 via the bus 208 is a storage device 212. The storage device 212 may be based on any of a variety of types of storage circuitry, numerous examples of which are provided in conjunction with FIG. 10. The key-delta file 112, column-delta file 114, and ETL results file 124 are illustrated as being in the storage device 212. Alternatively, these files may be stored in off-premises storage, such as a cloud server/storage device 214.

The apparatus 200 further includes k interfaces 210-1-210-k, for integer k, for making connections external to the apparatus (collectively, "interfaces 210"). For example, the apparatus 200 may be coupled to the source database 116, the target database 120 and the cloud storage/server 214. These interfaces 210 may be wired for local connections or wireless for remote connections.

Figure 3:
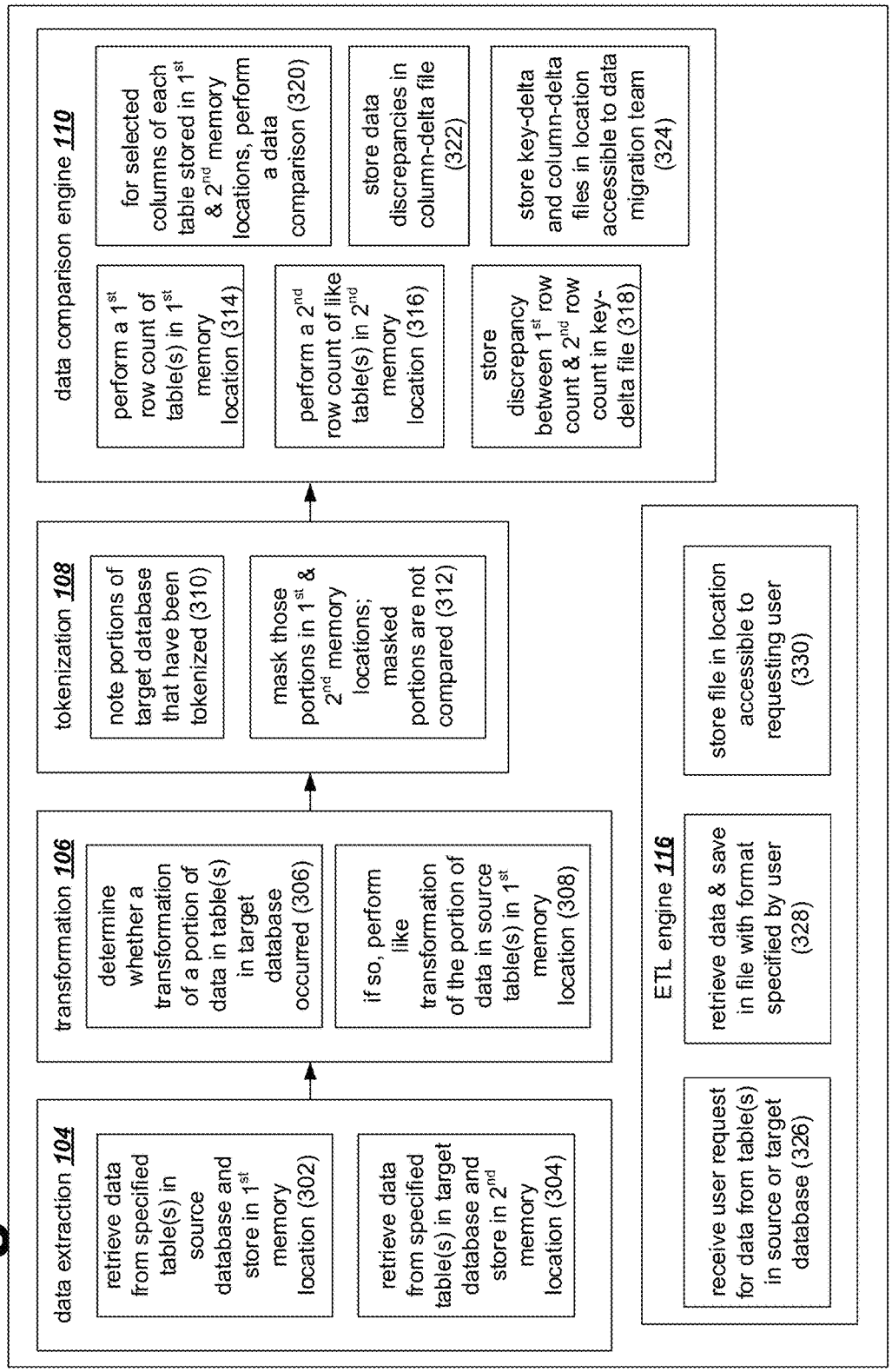
FIG. 3 illustrates an embodiment of a method for multi-table data validation.

FIG. 3 is a simplified block diagram of a method for multi-table data validation 300. Although FIGS. 2 and 3, and particularly, apparatus 200 and method 300, are described in conjunction with each other, apparatus 200 may be implemented and arranged to implement multi-table data verification using a different method than is described in FIG. 3 while the method 300 may be implemented by an apparatus different than that described in FIG. 2. The description is not limited in this respect.

The method for multi-table data validation 300 is organized according to the separate processes of the multi-table data validation software 102 in FIG. 1, namely, data extraction 104, transformation 106, tokenization 108, data migration 110, and ETL 116. The processes, data extraction 104, transformation 106, tokenization 108, and data comparison 110, may be performed in succession, although one or more portions of the processes may take place out of order. The ETL process 116 is not technically part of the data validation and is instead an additional capability of the method for multi-table data validation 300.

The data extraction process 104 consists of moving the data to be validated from both the source database 116 and the target database 120 for intermediate storage in memory. In this way, neither the source database 116 nor the target database 120 are manipulated by the multi-table data validation software 102. Instead, any manipulations to be performed in support of the validation take place in the temporary locations in memory. Thus, the data extraction 104 retrieves data from one or more specified tables in the source database 116 and stores the data in a first memory location (block 302). The data extraction 104 also retrieves data from like specified tables in the target database 120 and stores the data in a second memory location (block 304). Specified tables are those indicated by the configuration file 128. In an example, the TableName key under the tables section in the configuration file 128 would hold the table names that need to be imported from both the source and target databases of the configuration file.

The transformation process 106 consists of determining whether a transformation of a portion of data in tables in the second memory location (target database 120) occurred (block 306). If a transformation of data in the specified table did occur, a like transformation of the portion of data stored in the first memory location (source database 116) is performed (block 308). In some embodiments, the transformation process 106 uses the migration team notes 126 (FIG. 1) to determine where transformations occurred and updates the configuration file 128 to indicate those transformed portions to the data comparison engine 110. As explained above, the migration team notes 126 are provided by migration or development teams and manually entered in the configuration file 128. In an example, migration details are obtained from the source and target database administrators based on the type of database being used in each side. The transformation process 106 also transforms the data in the first memory location using the same mechanisms used by the data migration team, though not necessarily the same software. The transformation happens on the target data source once it is imported into the memory and overwritten with the changes, and then the comparison is done. The multi-table validation tool 102 is incorporated to handle the transformation logic based on the rules specified in the configuration file 128.

The tokenization process 108 addresses confidential information that was tokenized during migration between the source 116 and target 120 databases. Based on the migration team notes 126, the tokenization process 108 notes the portions of the target database that have been tokenized (block 310). The tokenization process 108 also masks those tokenized portions in the first and second memory locations (block 312) so that they will not be compared by the data comparison engine 110. The tokenization process is a different Application Program Interface (API) call that masks the data based on the categorization of the fields. If the data is in a Non-Public Information/Private Cloud Infrastructure (NPI/PCI), the data is masked using the tokenization API call and also these columns are marked to be excluded from comparison in the configuration file 128. Based on this information, the multi-table validation tool 102 skips the excluded columns while the comparison is done.

The data comparison engine 110 operates with the premise that the data extraction into the first and second memory locations has already occurred, with any transformations and masking of the extracted data being complete. The data comparison engine 110 uses the configuration file 128 to know which portions of the data are masked. The data comparison engine 110 performs a first row count of the selected tables in the first memory location (block 314) and performs a second row count of like selected tables in the second memory location (block 316). Any discrepancy between the first and second row counts is stored in the key-delta file 112 (block 318). The data comparison engine 110 also, for selected columns of tables stored in the first and second memory locations, performs a data comparison (block 320), with any discrepancy being stored in the column-delta file 114 (block 322). The key-delta file 112 and column-delta file 114 are stored in a location accessible to the data migration team (block 324), such as a local storage (e.g., storage device 212) or a remote storage (e.g., cloud server/storage 214).

The ETL engine process 116, as described above, is a separate feature in which a user may specify data to be retrieved from either the source database 116 or the target database 120. The user may also specify the format of the retrieved data. Accordingly, the ETL engine process 116 receives a request for data from one or more tables in the selected database (block 326). The requested data is retrieved and saved in a file format as specified by the user (block 328) and stored in a location available to the requesting user (block 330), such as the storage device 212 or the cloud server/storage 214.

The system for multi-table data validation 100 thus may be used to compare the data between the source database 116 and the target database 120 after data migration has occurred. By validating the migrated data, the multi-table data validation software 102 helps migration teams to ensure consistency and security after the data has been migrated, whether to a cloud, on-premises, third-party, or other storage location. In some embodiments, open-source technologies, such as Scala, are used for programming, a data extraction engine, such as Spark, is used for extracting the data from source and target data sources, and structured data processing software, such as Spark-SQL, is used for data transformation. The multi-table data validation software 102 supports a variety of commercially available databases, including, but not limited to, Cassandra, Oracle, IBM DB2, SQL Server, Postgres SQL, S3, Teradata, and Snowflake.

Further, the multi-table data validation software 102 may be packaged in a container including its dependencies (dockerized). The resulting portability enables the multi-table data validation software 102 to be run in a variety of different computing environments.

Using the configuration file 128, the multi-table data validation software 102 compares either one or multiple tables, all, or selective column(s) of data. In some embodiments, the configuration file 128 is a basic SQL script. FIGS. 4A and 4B illustrate a sample configuration file 400, written in basic SQL script, for performing a data compare between two tables. Three workflows, extract 402, delta 404, and load 406 are shown. The extract workflow 402 specifies the source and target database connections, as well as the names of tables to be compared. The delta workflow 404 specifies the primary or unique row key and the column names that are to be compared, as well as where the output will go. The load workflow 406, which does the actual comparison, specifies the location of the data mismatches during comparison or data to be migrated to be written to, which may be files or databases. The system 100 and method 300 for multi-table validation is designed to make the migration successful, with a complete validation of data being migrated from one database to another. The multi-table validation tool 102 performs validation before the data is completely migrated to the cloud databases from the on-premises databases. The multi-table validation tool 102 is used to make certain an "apples-to-apples", in other words, logical, comparison is made before migration to a production database is complete.

As explained above, the multi-table data validation software 102 compares both key/row level count and column level data. The comparison results are stored in two separate output files, the key-delta file 112 and column-delta file 114, respectively, for data mismatches. In some embodiments, the output files 112 and 114 are written to a cloud storage service, such as Amazon's Web Services Simple Cloud Storage Service (known as AWS S3) cloud location, accessible to the migration team. This enables the migration team to further evaluate the tools used to migrate the data from the source database 116 to the target database 120. In this manner, the mismatched data provided in the output files may help resolve issues with the data migration and improve successive migration efforts for an organization.

FIG. 5 is a sample key-delta output file 500 showing differences in the key/row count. The file header 502 features the Key, which for all the rows in this example, is the database name, the table name, and the column name, the Key Value, and the MissingLocation. In the first row entry of the key-delta output file 500, a row count mismatch occurred in the database named PMDW_ACCT_TB, the table named BILLG_STMT_DELQ_REC_DETL, and the column named sor_id, with the missing column value of 22 in the Teradata database. The row count mismatch informs why a source (target) database has more rows than the compared target (source) database, which assists in debugging. In the final row entry of the key-delta output file 502, a row count mismatch occurred in the database named PMDW_ACCT_TB, the table named LPS_PROC_MGMT_ISU, and the column named sor_id, with the missing column value of −2 in the Snowflake database.

FIG. 6 is a sample column-delta output file 600 showing differences in data between two databases. As with the key-delta output file 500 (FIG. 5), the file header 602 of the column-delta output file 600 features the Key, which in this example is the database name, the table name, and the column name, as before. The Key Value for the first row entry is PMDW_ACCT_TB (database name), ASSET (table name), and 97 (column name). Further, the file header 602 shows the ColumnName, which is the name of the column showing a mismatch, the sourceColumnType and target ColumnType, the data types, the sourceValue and TargetValue, which are the actual data in the source and target columns, respectively, that are being compared, and the MatchCondition, which is either "true", meaning no data mismatch, or "false", which means there is a data mismatch. In the first row entry of the column-delta output file 600, there is a discrepancy between the date in the first database (2018-07-26) and the date in the second database (2018-06-30). In the second row entry of the column-delta output file 600, there is a discrepancy between a timestamp in the first database (2018-07-28 04:54:09.614) and the timestamp in the second database (2018-07-30 11:51:08.0). Since the column-delta output file 600 is noting differences, the MatchCondition for all entries is "false".

As part of the system 100 or apparatus 200, the multi-table data validation software 102, has successfully evaluated tables having millions of rows and millions of columns each. The multi-table data validation software 102 may be automated to run daily at different intervals to produce reports in the form of the two output files illustrated in FIGS. 5 and 6, the key-delta, column-delta files. Migration teams may review these two files and fix data discrepancies if found. In some embodiments, the automation of the multi-table data validation software 102 helps avoid manual validation, reduces the time to validate, helps teams to fix data migration issues, ensures the data is consistent, and ensures the security is not compromised.

Organizations may have numerous data sources hosted on several heterogenous database engines, such as Teradata, DB2, SQL Server, Oracle, etc., in on-premise data centers. To accord with legal and compliance requirements of the organization or standards bodies with which the organization complies, data related to the organization's customers and business operations may be maintained for as little as a few months or for many years. These businesses further need to ensure that the customer's data is protected by tokenizing or masking sensitive data, such as social security numbers, credit card numbers, bank account numbers, and so on. In some embodiments, the tokenization or masking takes place before the data is migrated from one location to another.

It is possible to perform some manual data validation after a database has been migrated to another database, whether at another location or not. Manual data validation may work fine for tables containing 100-200 rows but some databases include tables having millions of rows. Databases of this size are not good candidates for manual data validation. Especially for very large databases, the multi-table data validation software 102 may be a good choice.

A database schema is a structure describing a database. Known also as an entity relationship diagram (ERD), a schema is a way of graphically diagramming a database, particularly a relational database. The basic building blocks of a database are tables and fields, and the fields of one table might be related to other fields in other tables of the database. The database schema graphically describes those relationships.

FIG. 7 is a table 700 showing data migration examples in which the multi-table data validation software 102 was successfully used. The first example in the table 700 was a migration from on-premises DB2 to AWS Cloud PostGresQL having four schemas, 133 tables, with a size of 110 gigabytes. The multi-table data validation software 102 was able to perform both row count and data comparisons between the two table. Other examples show more than 1000 tables. Some of the tables in these databases contain hundreds of columns and millions of rows. The failure to successfully migrate the data may cause data inconsistencies and security concerns for an organization. The multi-table data validation software 102 thus provides a useful tool to address these issues.

In the examples of FIG. 7, the source databases are on-premises while the target databases are cloud-based, but the multi-table data validation software 102 is agnostic to the location of each database, as long as there is an interface for connecting to the two databases (such as the interfaces 210 of the apparatus 200 in FIG. 2). The multi-table data validation software 102 works across homogenous (same) or heterogenous (different) database engines and generates a report containing the data discrepancies, including row count mismatches and column data mismatches between two databases.

An alternative to the multi-table data validation software 102 would be to merely validate the table row counts and a few hundred column data values, using a data validation tool (DVT) graphical user interface (GUI) tool built by other teams by picking one table at a time and selecting the individual columns manually to compare. In addition to being tedious, such solutions don't work with multiple table validation. Instead, these tools are limited to manually comparing fifty columns and a maximum of 15 million rows per table. Further, these manual solutions do not support the generation of the key-delta 112 and column-delta 114 output files that enable the migration team to improve its migration tools.

Figure 8:
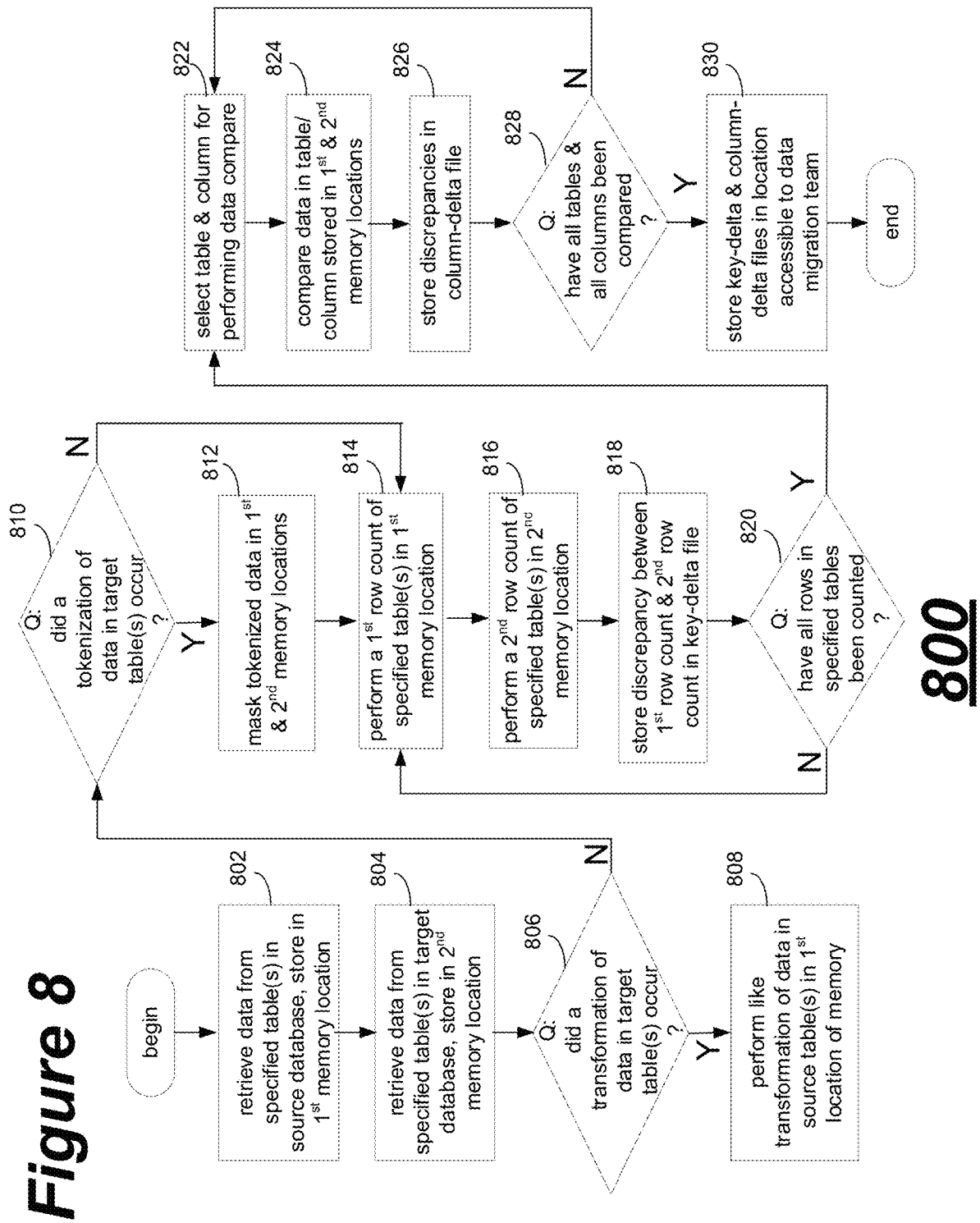
FIG. 8 is a flow diagram illustrating operations performed by the multi-table data validation software of FIGS. 1 and 2.

FIG. 8 is a flow diagram 800 illustrating the method operations performed by the multi-table data validation software 102 of FIGS. 1 and 2. One or more operations may take place in an order other than is presented in FIG. 8. The multi-table data validation software 102 commences by retrieving data from specified table(s) in the source database and storing the data in a first memory location (block 802). Similarly, data is retrieved from analogous specified table(s) in the target database and stored in a second memory location (block 804). These two operations may take place in reverse order. The extract workflow 402 in FIG. 4A provides an example of how the table(s) are specified. There, the table LONFILE is being extracted.

Next, an inquiry is made whether a transformation of data in the target table(s) occurred (block 806). If so, a like transformation of data in the source table(s) in the first memory location is performed (block 808). Similarly, an inquiry is made whether tokenization of the data in the target table(s) occurred (block 810). If so, the tokenized data is masked in the first and second memory locations (block 812). The migration team notes 126 provides information to answer the queries in blocks 806 and 810.

Once the transformation and tokenization inquiries are answered, control proceeds to checking the row count between the two memory locations. A first row count of table(s) in the first memory location is performed (block 814). A second row count of table(s) in the second memory location is performed (block 816). These two operations may take place in reverse order. If any discrepancy is found between the row counts, that information is saved in the key-delta output file (block 818). Once the row counts are complete, an inquiry is made whether additional rows of additional tables are yet to be counted (block 820). If not, control proceeds back to block 814, where a new set of row counts is made (block 814 and 816) and stored in the key-delta output file (block 818). This process is repeated until a successful row count comparison is completed for all specified tables in the two memory locations.

Once all row counts have been conducted, a table and one or more columns of the table are selected for performing a data compare (block 8122). A comparison between the selected table/column(s) is made between the first and second memory locations (block 824), which are the copies of the source and target databases, respectively. Any discrepancies during this comparison are saved in the column-delta output file (block 826). An inquiry is then made whether all the tables and columns have been compared (block 828). If not, control proceeds back to block 822, where a new set of data comparisons is performed (blocks 822 and 824) and stored in the column-delta output file (block 826). This process is repeated until a successful data comparison is completed for all tables in the two memory locations.

Software designers of ordinary skill in the art will recognize a number of modifications that may be made to the flow diagram 800 while still performing the desired tasks. For example, the row count comparison (blocks 814, 816, 818, and 820) and the column data comparison (blocks 822, 824, 826, and 828) operations may be reversed so that column data is compared before row counts are compared. Or, for a give table/column, a row count comparison may be done followed by a column data comparison (or vice-versa), before proceeding to perform the operations on a next table/column. Finally, the key-delta and column-delta output files are stored in a location accessible to the data migration team (block 830).

Figure 9:
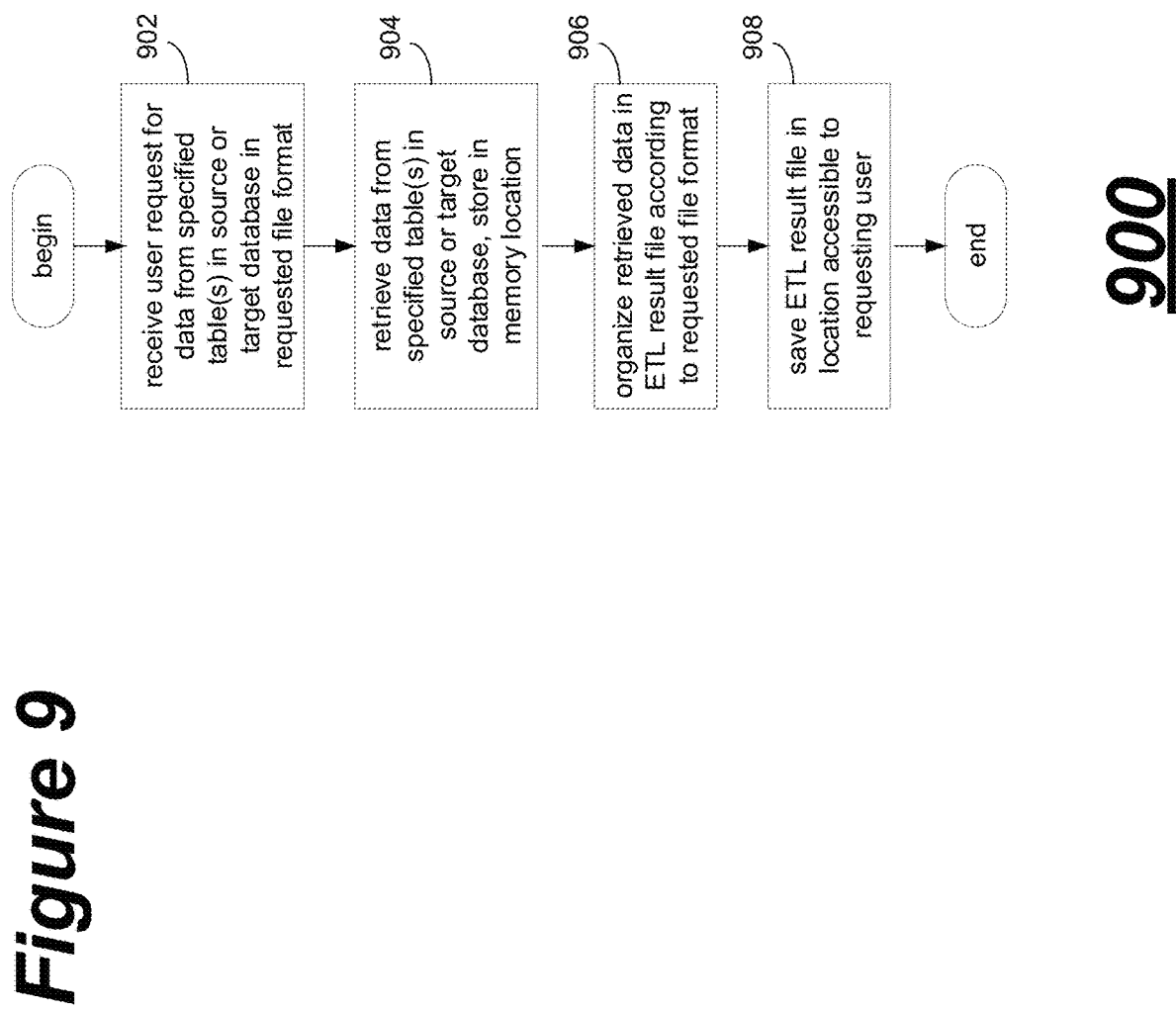
FIG. 9 is a flow diagram illustrating operations performed by the ETL engine of the multi-table data validation software of FIGS. 1 and 2.

FIG. 9 is a flow diagram 900 illustrating operations performed by the ETL engine 110 of the multi-table data validation software 102 of FIGS. 1 and 2. A user request for specific data from the target database is received. The specific data may be particular column(s) of data from a particular table, as one example. The user request further specifies a file format for the retrieval (block 902). The ETL engine 110 of the multi-table data validation software 102 retrieves the data from the specified table(s) in the target database and stores the data in a memory location (block 904). In some embodiments, only the specified data is retrieved and stored in the memory location. In other embodiments, the table containing the specified data is retrieved and stored. The table and/or column names to be retrieved are mentioned in block 104 and the transformation, if needed, in block 106. Since the user specified a file format, the ETL engine 110 next organizes the retrieved data to accord with the requested file format (block 906). The ETL output file is then saved in a location accessible to the requesting user (block 908), such as a cloud. The operations of the ETL engine 110 are complete.

Figure 10:
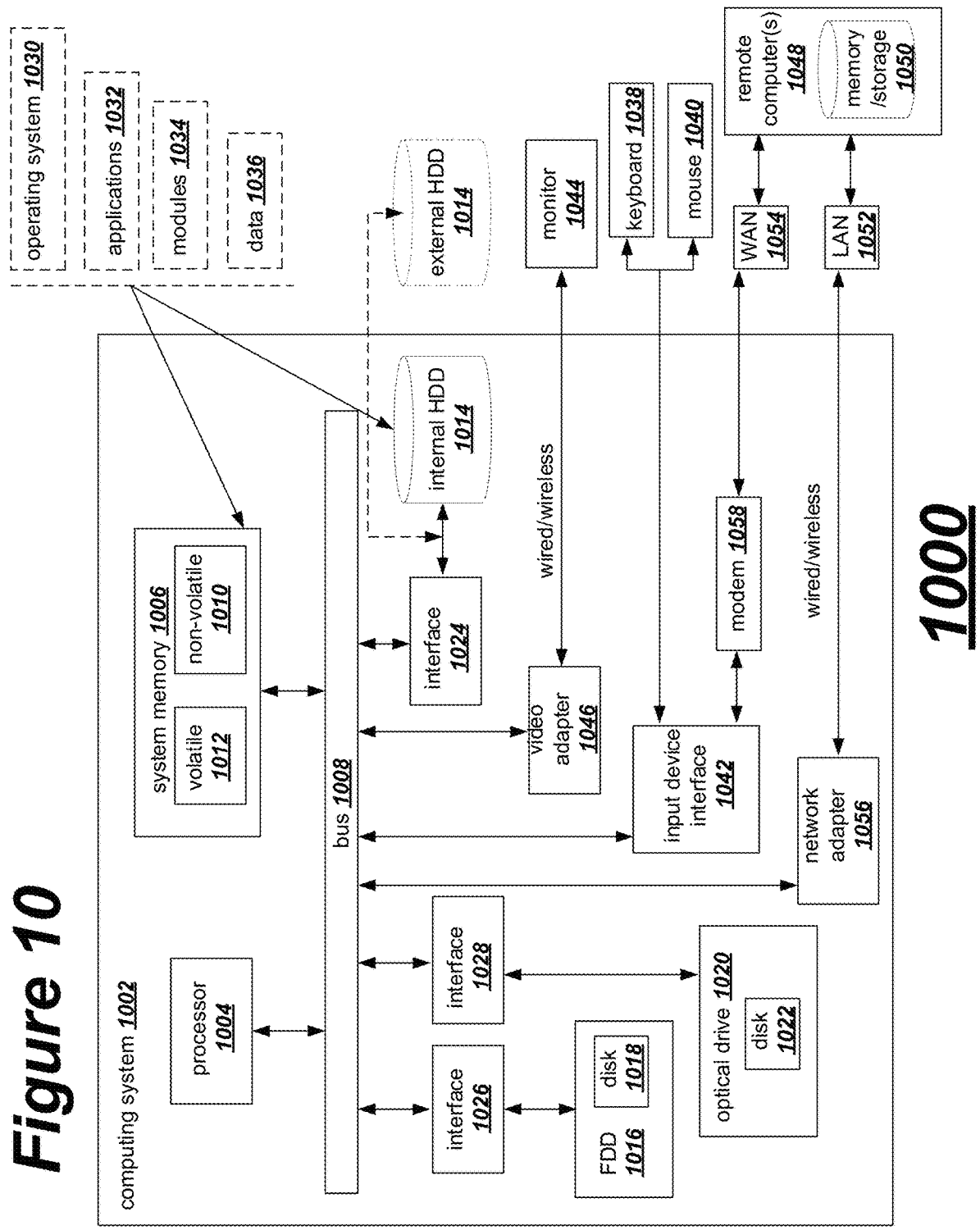
FIG. 10 illustrates an embodiment of a communications architecture.

FIG. 10 illustrates an embodiment of an exemplary computing architecture 1000 comprising a computing system 1002 that may be suitable for implementing various embodiments as previously described. In various embodiments, the computing architecture 1000 may comprise or be implemented as part of an electronic device. In some embodiments, the computing architecture 1000 may be representative, for example, of a system that implements one or more components of the system 100, apparatus 200, and method 300 for multi-table data validation. In some embodiments, computing system 1002 may be representative, for example, of the apparatus 200 for multi-table data validation. The embodiments are not limited in this context. More generally, the computing architecture 1000 is configured to implement all logic, applications, systems, methods, apparatuses, and functionality described herein.

As used in this application, the terms "system" and "component" and "module" are intended to refer to a computer-related entity, either hardware, a combination of hardware and software, software, or software in execution, examples of which are provided by the exemplary computing architecture 1000. For example, a component can be, but is not limited to being, a process running on a computer processor, a computer processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing system 1002 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing system 1002.

As shown in FIG. 10, the computing system 1002 comprises a processor 1004, a system memory 1006 and a system bus 1008. The processor 1004 can be any of various commercially available computer processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core®, Core (2) Duo®, Itanium®, Pentium®, Xeon®, and XScale® processors; and similar processors. Dual microprocessors, multi-core processors, and other multi-processor architectures may also be employed as the processor 1004.

The system bus 1008 provides an interface for system components including, but not limited to, the system memory 1006 to the processor 1004. The system bus 1008 can be any of several types of bus structure that may further interconnect to a memory bus (with or without a memory controller), a peripheral bus, and a local bus using any of a variety of commercially available bus architectures. Interface adapters may connect to the system bus 1008 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 1006 is not a propagating signal divorced from the underlying hardware of the computing system 1002 and is thus non-transitory. The system memory 1006 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 10, the system memory 1006 can include non-volatile memory 1010 and/or volatile memory 1012. A basic input/output system (BIOS) can be stored in the non-volatile memory 1010.

The computing system 1002 may include various types of computer-readable storage media in the form of one or more lower speed memory units, including an internal (or external) hard disk drive (HDD) 1014, a magnetic floppy disk drive (FDD) 1016 to read from or write to a removable magnetic disk 1018, and an optical disk drive 1020 to read from or write to a removable optical disk 1022 (e.g., a CD-ROM or DVD). The HDD 1014, FDD 1016 and optical disk drive 1020 can be connected to the system bus 1008 by a HDD interface 1024, an FDD interface 1026 and an optical drive interface 1028, respectively. The HDD interface 1024 for external drive implementations can include at least one or both of Universal Serial Bus (USB) and IEEE 1394 interface technologies. The computing system 1002 is generally is configured to implement all logic, systems, methods, apparatuses, and functionality described herein with reference to FIGS. 1-9.

The drives and associated computer-readable media provide volatile and/or nonvolatile storage of data, data structures, computer-executable instructions, and so forth. For example, a number of program modules can be stored in the drives and memory units 1010, 1012, including an operating system 1030, one or more application programs 1032, other program modules 1034, and program data 1036. In one embodiment, the one or more application programs 1032, other program modules 1034, and program data 1036 may include, for example, the various applications and/or components of the multi-table data validation software 102 of the system 100 for multi-table data validation.

A user can enter commands and information into the computing system 1002 through one or more wire/wireless input devices, for example, a keyboard 1038 and a pointing device, such as a mouse 1040. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processor 1004 through an input device interface 1042 that is coupled to the system bus 1008, but can be connected by other interfaces such as a parallel port, IEEE 1394 serial port, a game port, a USB port, an IR interface, and so forth.

A monitor 1044 or other type of display device is also connected to the system bus 1008 via an interface, such as a video adaptor 1046. The monitor 1044 may be internal or external to the computing system 1002. In addition to the monitor 1044, a computer typically includes other peripheral output devices, such as speakers, printers, and so forth.

The computing system 1002 may operate in a networked environment using logical connections via wire and/or wireless communications to one or more remote computers, such as a remote computer 1048. The remote computer 1048 may, for example, store the source and target databases 116 and 120, while the multi-table data validation software 102 resides on the computing system 1002. The remote computer 1048 can be a workstation, a server computer, a router, a personal computer, portable computer, microprocessor-based entertainment appliance, a peer device or other common network node, and typically includes many or all of the elements described relative to the computing system 1002, although, for purposes of brevity, only a memory/storage device 1050 is illustrated. The logical connections depicted include wire/wireless connectivity to a local area network (LAN) 1052 and/or larger networks, for example, a wide area network (WAN) 1054. Such LAN and WAN networking environments are commonplace in offices and companies, and facilitate enterprise-wide computer networks, such as intranets, all of which may connect to a global communications network, for example, the Internet.

When used in a LAN networking environment, the computing system 1002 is connected to the LAN 1052 through a wire and/or wireless communication network interface or adaptor 1056. The adaptor 1056 can facilitate wire and/or wireless communications to the LAN 1052, which may also include a wireless access point disposed thereon for communicating with the wireless functionality of the adaptor 1056.

When used in a WAN networking environment, the computing system 1002 can include a modem 1058, or is connected to a communications server on the WAN 1054 or has other means for establishing communications over the WAN 1054, such as by way of the Internet. The modem 1058, which can be internal or external and a wire and/or wireless device, connects to the system bus 1008 via the input device interface 1042. In a networked environment, program modules depicted relative to the computing system 1002, or portions thereof, can be stored in the remote memory/storage device 1050. It will be appreciated that the network connections shown are exemplary and other means of establishing a communications link between the computers can be used.

The computing system 1002 is operable to communicate with wired and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operation in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner and may generally include any set of one or more limitations as variously disclosed or otherwise demonstrated herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus comprising:
    a processor; and
    memory coupled to the processor, the memory comprising instructions that, when executed by the processor, cause the processor to:
        tokenize one or more portions of a source database;
        load a first table from the source database into first memory locations, the source database being a first type of database;
        generate, via a software program for migrating the source database, a target database including at least the tokenized portions, wherein the tokenized portions comprises substitutes of confidential information that has been stripped from the source database prior to migration and the tokenized portions being masked in the first memory locations, and the target database being a second type of database different from the first type of database;
        load a second table from the target database into second memory locations, the tokenized portions being masked in the second memory locations;
        perform a row count comparison between the first table and the second table;
        store results of the row count comparison in a row count mismatch file;
        perform a data comparison between the first table and the second table, wherein the tokenized portions being masked in the first and second memory locations are excluded from the data comparison between the first and second tables; and
        store results of the data comparison in a data mismatch file.

2. The apparatus of claim 1, the memory further comprising instructions that, when executed by the processor, cause the processor to:
    extract the first table from the source database; and
    extract the second table from the target database.

3. The apparatus of claim 2, wherein the extraction is done using a distributed data processing engine.

4. The apparatus of claim 1, wherein the first table comprises elements of a first data type, the second table comprises elements of a second data type, and the first data type is different than the second data type.

5. The apparatus of claim 4, the memory further comprising instructions that, when executed by the processor, cause the processor to:
    transform the elements of the second data type into the first data type.

6. The apparatus of claim 5, wherein the transformation is done using structured data processing software.

7. The apparatus of claim 1, the memory further comprising instructions that, when executed by the processor, cause the processor to:
    store the row count mismatch file and the data mismatch file in a cloud storage service.

8. The apparatus of claim 7, the memory further comprising instructions that, when executed by the processor, cause the processor to:
    retrieve the row count mismatch file and the data mismatch file from the cloud storage service;

analyze the row count mismatch file and the data mismatch file; and modify the software program as a result of the analysis.

9. The apparatus of claim 1, wherein the data comparison is done per column between the first table and the second table.

10. At least one non-transitory machine-readable storage medium comprising instructions that, when executed by a processor, cause the processor to:
retrieve a first table from a source database, wherein the source database is a first type of database;
retrieving a second table from a target database, wherein the target database is generated by migrating the source database;
perform a column level data analysis by:
selecting a column of the first table;
selecting an analogous column of the second table;
comparing first data in the first column with second data in the analogous column; and
generating a first file to store differences between the first data and the second data; and
wherein one or more portions of the source database are tokenized such that the target database includes at least the tokenized portions, wherein the tokenized portions comprises substitutes of confidential information that has been stripped from the source database prior to migration and the tokenized portions being masked in first memory locations, and the target database being a second type of database different from the first type of database, and the tokenized portions being masked in second memory locations, and wherein the tokenized portions being masked in the first and second memory locations are excluded from comparison of the first data in the first column with second data in the analogous column.

11. The at least one non-transitory machine-readable storage medium of claim 10, further comprising instructions that, when executed by the processor, cause the processor to:
count a first number of rows in the first table;
count a second number of rows in the second table; and
store a difference between the first number and the second number in a second file.

12. The at least one non-transitory machine-readable storage medium of claim 11, further comprising instructions that, when executed by the processor, cause the processor to:
store the first file and the second file in a cloud storage service.

13. The at least one non-transitory machine-readable storage medium of claim 12, further comprising instructions that, when executed by the processor, cause the processor to:
retrieve the second file from the cloud storage service; and
analyze the second file;
wherein an empty second file means the first table and the second table have the same number of rows.

14. The at least one non-transitory machine-readable storage medium of claim 12, further comprising instructions that, when executed by the processor, cause the processor to:
retrieve the first file from the cloud storage service; and
analyze the first file;
wherein an empty first file means the first table and the second table have the same data.

15. An apparatus comprising a processor and memory coupled to the processor, the memory comprising instructions that, when executed by the processor, cause the processor to:
tokenize one or more portions of a source database;
extract a first table from the source database into first memory locations, wherein the source database is a first type of database;
generate, by migrating the source database, a target database including at least the tokenized portions, wherein the tokenized portions comprises substitutes of confidential information that has been stripped from the source database prior to migration and the tokenized portions being masked in the first memory locations, and the target database being a second type of database different from the first type of database;
extract a second table from a target database into second memory locations, the tokenized portions being masked in the second memory locations;
perform a first comparison between the first memory locations and the second memory locations to determine a mismatch in the number of rows between the first table and the second table, wherein the first comparison is stored in a row count file;
perform a second comparison between data stored in the first memory locations and the second memory locations to determine a mismatch in the data between the first table and the second table, wherein the second comparison is stored in a column delta file and the tokenized portions being masked in the first and second memory locations are excluded from the second comparison;
analyze the row count and column delta files to update a software program used to migrate the source database to the target database.

16. The apparatus of claim 15, wherein the first table comprises elements of a first data type, the second table comprises elements of a second data type, and the first data type is different than the second data type.

17. The apparatus of claim 16, the memory further comprising instructions that, when executed by the processor, cause the processor to:
transform the elements of the second data type into the first data type.

18. The apparatus of claim 5, wherein the transformation is done using structured data processing software and the extraction is done using a distributed data processing engine.

19. The apparatus of claim 1, wherein the first type of database is an on-premise database or a cloud-based database and wherein the second type of database is the on-premise database or the cloud-based database.

* * * * *